(12) United States Patent
Maatuk

(10) Patent No.: US 6,776,037 B2
(45) Date of Patent: Aug. 17, 2004

(54) MICROPROCESSOR-BASED LIQUID SENSOR AND ICE DETECTOR

(76) Inventor: Josef Maatuk, 1607 S. Sherbourne Dr., Los Angeles, CA (US) 90035

( * ) Notice: Subject to any disclaimer, the term of this patent is extended or adjusted under 35 U.S.C. 154(b) by 30 days.

(21) Appl. No.: 09/845,979

(22) Filed: May 1, 2001

(65) Prior Publication Data

US 2002/0100318 A1 Aug. 1, 2002

Related U.S. Application Data

(63) Continuation of application No. 09/169,167, filed on Oct. 8, 1998, now abandoned, and a continuation of application No. 08/703,002, filed on Aug. 26, 1996, now Pat. No. 5,908,985, and a continuation of application No. 08/414,239, filed on Mar. 31, 1995, now Pat. No. 5,730,026.

(51) Int. Cl.[7] .......................... G01F 23/00; G01N 25/00
(52) U.S. Cl. .............................. 73/295; 374/54; 374/16; 374/15; 374/45; 340/580; 340/581
(58) Field of Search .............................. 73/295; 374/15, 374/54, 16, 45; 340/580, 581

(56) References Cited

U.S. PATENT DOCUMENTS

| | | | | |
|---|---|---|---|---|
| 2,279,043 A | * | 4/1942 | Harrington | ................... 73/295 |
| 3,279,252 A | * | 10/1966 | Barlow | ........................ 73/295 |
| 4,573,128 A | * | 2/1986 | Mazur | ......................... 73/295 |
| 5,521,584 A | * | 5/1996 | Ortolano et al. | ............. 340/581 |
| 5,730,026 A | * | 3/1998 | Maatuk | ....................... 73/295 |
| 5,908,985 A | * | 6/1999 | Maatuk | ....................... 73/295 |

* cited by examiner

Primary Examiner—Hezron Williams
Assistant Examiner—Rodney T. Frank

(57) ABSTRACT

Apparatus and a method of operating any structural configuration of a heater and array of temperature sensors to measure with high accuracy, the level of stratified liquids like water and oil or water and gasoline and non-stratified liquids, liquid temperature, and other liquid properties and detect ice formation on aircraft surfaces. Thin and narrow strips of dissimilar material will be used for the heater, array of temperature sensors, mount, and coating. The connecting wires to and from the apparatus will be from the same material. Simultaneous measurements from all the temperature sensors, before and after heat is applied, will be used to generate accurate temperature profiles for the entire configuration and not just from two adjacent temperature sensors. Different features of the temperature profiles will determine accurately the liquid level, liquid temperature and other liquid properties. Apparatus of the invention may also be used to detect ice formation.

10 Claims, 11 Drawing Sheets

MICROPROCESSOR-BASED LIQUID SENSOR AND ICE DETECTOR

This is a continuation of application Ser. No. 09/169,167 filed Oct. 8, 1998 now abandoned, and U.S. patent application Ser. No. 08703002 now U.S. Pat. No. 5,908,985 filed on Aug. 26, 1996, and U.S. patent application Ser. No. 08144239 now U.S. Pat. No. 5,730,026 filed on Mar. 31, 1995.

DESCRIPTION OF THE PRIOR ART

Present Liquid Level measuring devices that are similar to this invention utilize a resistive type probe and rely on the change of resistivity of the probe with temperature. A significant decrease in the resistivity of the probe over its value when it was measured in air indicates that the probe is submerged in liquid. Devices that rely on change in resistivity are usually only capable of determining whether or not a certain level, such as the location of the probe, is reached. Even when several probes are used, liquid levels can only be determined at discrete locations of the probe. Intermediate levels between two probes can not be determined. Resistive probes are only accurate at the temperatures in which they are calibrated. They need to be re-calibrated at other operating temperatures. Furthermore, resistive probes usually require compensating resistors or circuits, resulting in a network that is susceptible to electromagnetic interference or electrical noise from other electrical/electronic equipment within its vicinity.

This invention precludes the shortcomings inherent in liquid level devices employing resistive probes, because actual temperature are used and processed, and the temperatures measured are dependent on heat transfer mechanisms rather than change in resistivity of the probe material. Furthermore, the invention is capable of not only determining liquid level at discrete points where the temperature sensors are located, but can also measure liquid levels at intermediate points between two temperature sensor locations, which the resistive type device is incapable of doing.

The heat transfer mechanism creates a voltage or a temperature profile along a heater. This profile is used to determine the discrete and continuous liquid level. In the prior art, U.S. Pat. No. 2,279,043 Harrington used heated liquids in a container to determine the discrete liquid levels with a set of discrete thermocouples. In U.S. Pat. No. 3,279,252 Barlow used heated cylinder to determine the discrete liquid levels. In U.S. Pat. Nos. 5,730,026 and 5,908,985 Maatuk used a separate heated Nichrome wire and a strip to determine the continuous and discrete liquid levels.

In this invention, a method is presented to create a desired profile along a heater that is also used as a common wire for a set of discrete thermocouples. In other words, the separate heater is eliminated and instead, the common wire of the thermocouple set is also used as the heater.

In U.S. Pat. No. 4,573,128 Wilson and U.S. Pat. No. 4,573,128 Mazur used a poured molted liquid in a container to obtain a profile and measure the liquid level in a container. In this invention, I apply heat to the surface of a wire to obtain a profile along the wire, This invention also detects ice on a surface by looking at a phase change effect ("Igloo") and temperature profile. In U.S. Pat. No. 5,521,584 Ortolano detect ice by measuring heat flow and heat measurement.

SUMMARY OF THE INVENTION

The invention described herein is a means of measuring the level of a liquid in a liquid container such as a fuel tank by means of a probe to which heat is applied and the temperature along the length of the probe is measured. This invention makes use of the difference in cooling efficiency between liquid and gas such as air, or between two different liquids, such as water and oil. When heat is applied to the probe, the temperature of the portion of the probe submerged in liquid is significantly lower than the temperature of that portion of the probe outside of the liquid and typically exposed to air. This is because the liquid removes heat at faster rate than air, so that the temperature difference between the surface of the probe is much lower in liquid than it is in air. This is also true between a liquid that removes heat more efficiently, such as water, and a liquid that does not remove heat as efficiently, such as oil. Temperature sensors, such as thermocouples or thermistors that are attached to various points on the probe measure the temperatures at those respective locations on the probe. This invention is not only capable of determining where the liquid level is at discrete points where the temperature sensors are attached. It can also determine where the liquid level is between two discrete points to within a fraction of centimeter accuracy, when precision temperature measurement devices are used in conjunction with suitable microprocessor, which process the signals received from the temperature sensors.

The purpose of this invention is to provide a device that can measure liquid levels, such as that of fuel in an automobile fuel tank or lubrication oil level in an automobile engine compartment fairly accurately and with minimal effort, such as simply pushing a button on an instrument panel, as shown in FIG. 1. The advantages of this invention are (1) It can measure liquid levels accurately, within a fraction of a centimeter; (2) It requires a very small amount of power to operate; (3) It is compact and light weight and can be installed in relatively small liquid containers if necessary; (4) It is reliable since it has no moving parts; (5) because it requires a very small power for operation, it does not generate any significant amount of electromagnetic energy which could interfere with the performance of other electrical/electronic equipment; and (6) with certain modifications to the device, it can be used to measure other important liquid parameters such as viscosity and density. This device can also be adopted for the detection of ice formation on the external surface of an aircraft, such as the external surface of an aircraft wing or fuel tank.

DETAILED DESCRIPTION OF THE INVENTION

Figure 1:
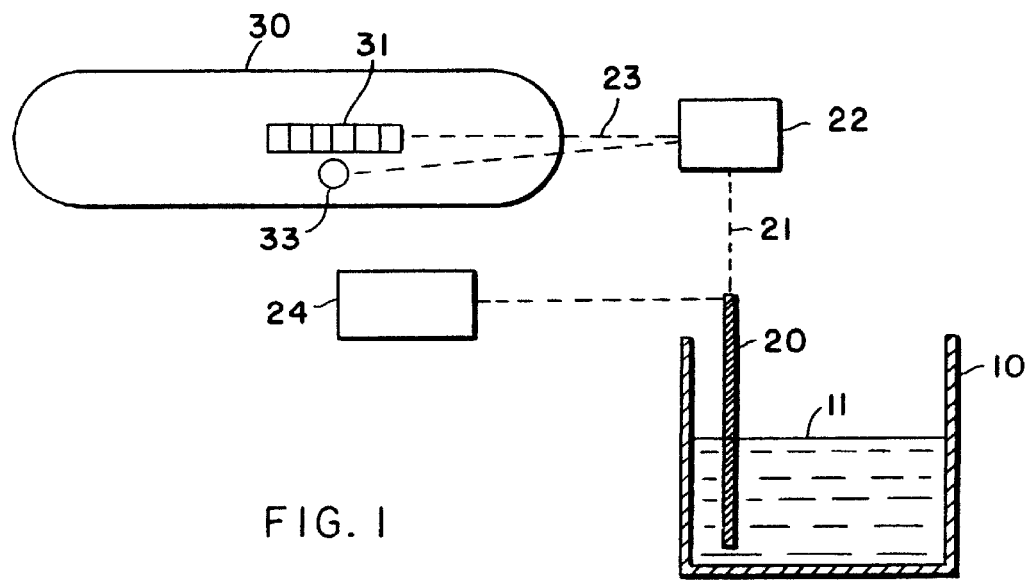
FIG. 1 is a schematics of a typical liquid level measuring device application.

An (optionally) heated sensing strip (may be wire or ribbon or etc.) instrumented with thermal sensing taps formed (e.g.) by lead wires of a material dissimilar to the sensing strip (e.g. a Constantan strip with Copper lead wires or traces on plastic sheets). The strip may be heated directly (e.g. flowing a current through the Constantan material when not measuring the theromopotentials) or indirectly (e.g. laminating an isolated heater over the sensing strip to form independent heating and measuring processes) to image the heat flow characteristics along the strip. Equally, the strip may be used as a passive sensor in applications where, for instance, the thermal striations along the strip are of interest.

The packaging and materials, and the locations of the thermal sensing taps, are engineered to properly sample the thermal gradients along the strip. An analog (spatial) profile of the temperature along the strip is reconstructed from these samples, and this analog profile may be processed to accurately discern levels, layers, properties (like viscosity, kind of liquid), etc. in the stripes environment.

The instrumentation electronics need only be capable of microvolt measurements, plus analog or digital processing as appropriate to the application. Scanning the taps in sequence may be used to transform the information of the analog spatial profile into the time domain for simple analog filtering to reconstruct the profile, and thresholding circuits for decisions. Equally, digitizing the data from the sensing taps allows digital processing, possibly for more elaborate signature analysis, for ease of recalibration, etc. Output circuits and format may be whatever is appropriate to the application (e.g. digital dashboard, analog level meters, warning lights, etc.).

Using the reading from all the point sensors to make discrete decisions as to (for instance) a level are easy to make based simply on comparing the individual measurements to each other. For an environment where the fluids (or whatever is being tested) have substantially dissimilar properties (e.g. air/water), the data also readily supports simple interpolation between points, with increasing accuracy requiring increasing the accuracy of resolving the end-points and increasing the complexity of the interpolation algorithm.

Substantial improvement in the decision accuracy is obtained by incorporating the data from multiple points, rather than just the two points on either side of the fluid boundary. By using many data points to fit the profile along the strip, the accuracy of the overall curve is improved beyond the accuracy of single measurements, the individual measurement uncertainties tend to average out. Further, the fitting of multiple points to a model that incorporates the effects of different fluid characteristics and heat inputs allows substantial improvements in discerning boundaries between fluids that are more closely matched in properties (e.g. water/oil) and in discerning the properties of the fluids themselves (e.g. viscosity).

A typical application of the liquid level measuring apparatus is measuring the liquid level of fuel in an automobile fuel tank or lubrication oil level in an automobile engine compartment. A schematic diagram of such an application is shown in FIG. 1. The schematic diagram in FIG. 1 depicts an automobile engine oil pan 10 containing lubrication oil 11. The liquid level sensor probe 20 is installed inside the oil pan 10. A plurality of electrical wires 21 connect the probe 20 to data acquisition circuit that is connected to a microprocessor 22 which may be located in the engine compartment of the automobile or behind the automobile instrument panel 30 or very close to the probe. The microprocessor is in turn connected by one or more wires 23 to an analog or digital display 31 located on the automobile instrument panel 30. The data acquisition circuit and the microprocessor is situated with respect to the probe as appropriate for the noise and cabling constraints of the application environment. A pulsed power supply 24 made of one or two batteries or AC is located either in the engine compartment, behind the automobile instrument panel or close to the probe and electrically connected to the microprocessor 22, the probe 20 and an activation button or switch 33 located on the automobile control panel, provides pulsed electrical energy to the liquid level sensing system. Sensing of the lubrication oil level is accomplished by activating the button or switch 33, sending pulsed electrical energy to the probe 20 and the microprocessor 22. The lubrication oil level is displayed on the display 31.

Figure 2:
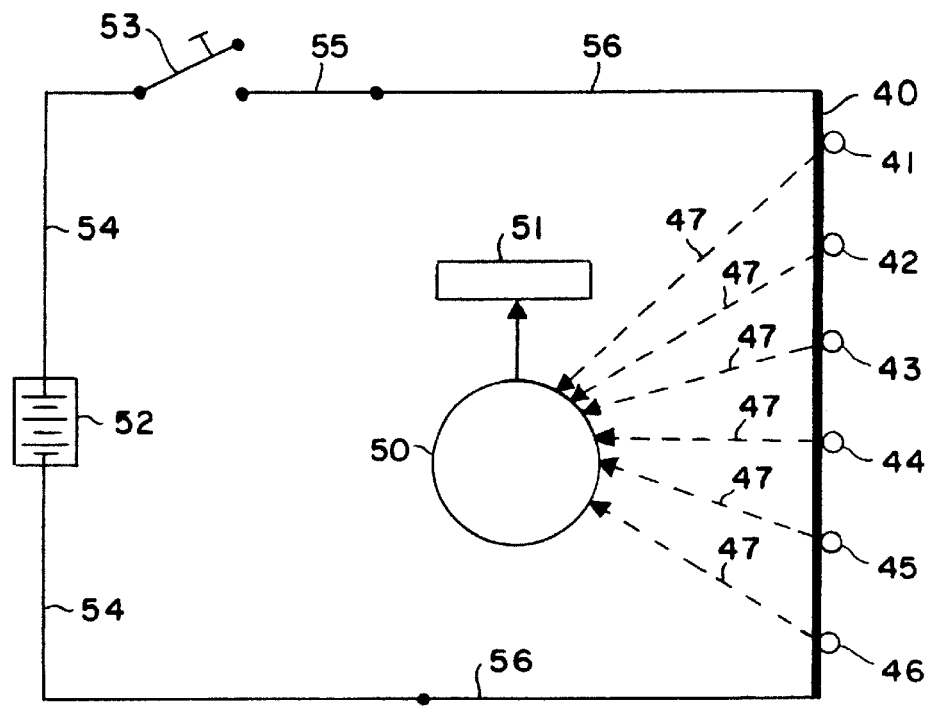
FIG. 2 is a schematic diagram of one embodiment of the invention.

The apparatus makes use of the cooling efficiency between liquid and gas, such as air, or between two different liquids such as water and oil. One embodiment of the invention is depicted schematically in FIG. 2. The embodiment depicted schematically in FIG. 2 is comprised of a probe 40 made from 0.002 inch diameter Nichrome wire three inches in length but maybe of any suitable lengths, a data acquisition circuitry and a microprocessor 50, a display 51, an electrical power source 52, a switch 53, electrical wires 54 and, wires 56. Six thermocouples beads 41, 42, 43, 44, 45 and 46 from 0.008 inch diameter or Copper-Constantine pairs of wires are attached to the probe 40 by wrapping the probe Nichrome wire around the thermocouples beads 41 through 46. The number of thermocouples beads may be varied depending on the length of the probe and the accuracy desired. The thermocouples 41 through 46 are electrically connected to the data acquisition circuitry by a Copper-Constantine wires 47 of suitable size and length. The probe 40 is coated with an insulative material to electrically isolate it from the thermocouples beads 41 through 46.

Referring again to FIG. 2, when the switch 53 is in the open position and no power is applied to the probe 40, the temperature of the thermocouples 41 through 46 will measure the same temperature as the media which surrounds the probe, either air or liquid or both. When the switch 53 is in the closed position, a pulsed current flows through the circuit including the probe and heat is generated at the probe 40 in the form of —$I^2R$— losses. The heat generated at the probe 40 is dissipated to the surrounding medium. In order for heat to be dissipated to the surrounding medium the temperature of the probe has to be higher than that of the surrounding medium. At steady-state condition, that is when the temperatures have stabilized some time after the switch 53 is closed, usually several seconds, the characteristics temperature difference between the medium and the probe 40 is established. For example, if 6.0 milliwatts of power is applied to the probe and the entire probe is in air which is maintained at a constant temperature of 20 degrees C., the temperature at the thermocouple location 41 through 46 are approximately 35 degrees C., or approximately 15 degrees C. higher than the temperature of the surrounding air when steady-state condition is reached. If the entire probe is immersed in water, also maintained at 20 degrees C., the temperature of the probe at the thermocouples 41–46 locations will only be slightly above 20 degrees C. The actual temperatures at the thermocouples locations are found in Table 1. This is because water can remove heat from the probe at much faster rate than air.

Figure 3:
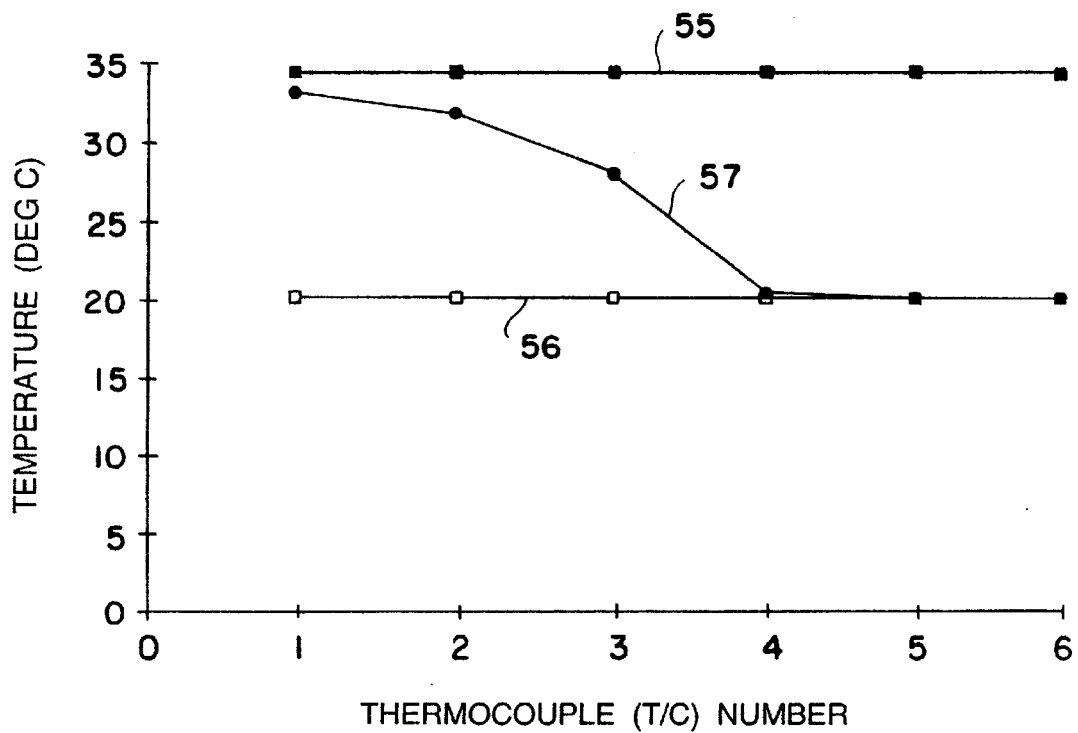
FIG. 3 Probe temperature profile.

So the water requires only a small temperature difference (less than 1 degree C.) to remove the same heating rate as the air has to remove. In FIG. 3, the temperature profile of the probe is shown for three conditions: (1) where the entire probe with 6.0 milliwatts power is in air whose temperature is 20 degrees C. (55), (2) where the probe is completely immersed in water whose temperature is 20 degrees C. (56), and (3) where the probe is immersed it water from thermocouples location 43 to 46, with both air and water maintained at 20 degrees C.

Figure 3A:
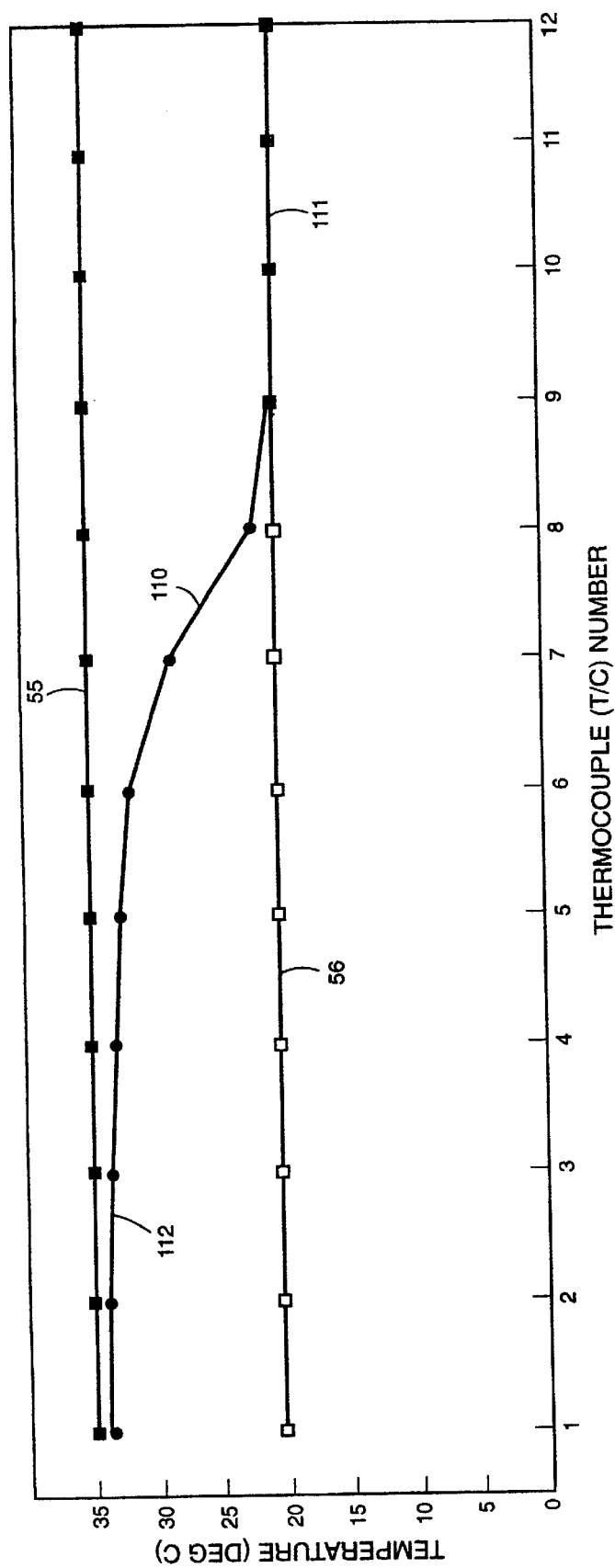
FIG. 3a Generic Probe temperature profile.

FIG. 3a shows a typical temperature profile of a 6 inch probe 20 with 0.5 inch spacing between the thermocouples. This profile is made of three sections: (1) section 111, which is the temperature profile of the probe section that is immersed in liquid below the liquid level point. (2) section 112 which is the temperature profile of the portion of probe 20 that is in air (or other medium) but some distance above the liquid level. (3) section 110, which is the curved portion of the temperature profile of probe 20. By proper design of the probe 40, this curved section of the probe profile can be designed to be shallow or steep.

In this example heat is transferred from the surface of the probe to the surrounding medium by free convection. The basic convection heat transfer equation (applicable to both free and forced convection) is $$Q=HA(Tp-Tm) \quad (1)$$

Where Q is the heat transfer rate

H is the convection (free convection in this case) heat transfer coefficient.

A is the area of the probe exposed to the medium

Tp is the temperature of the probe surface exposed to the medium

Tm is the temperature of the medium (air or water in this example)

The temperature difference between the probe surface and the medium is expressed as DT or $$DT=Tp-Tm=Q/(HA) \quad (2)$$

In this example the values of Q and A in equations 1 and 2 are held constant. Only H, which is a measure of the heat transfer coefficient or heat removal efficiency, is varied. The higher H is the lower DT is. Water, which is a good heat transfer liquid, usually orders of magnitude better than air in removing heat from the probe both by free convection and forced convection. Therefore it requires a very small DT compared to that required by air in removing the same amount of heating rate or power.

When only liquid levels at discrete locations are desired, such as where the six thermocouples 41–46 are located, the processing of the temperature data becomes relatively simple. The points (thermocouples locations) that are completely immersed in water will indicate a much smaller DT. For example, if thermocouples 44, 45 and 46 are completely immersed in water and thermocouples 41, 42 and 43 are in air, the temperature of the six thermocouples 41–46 will not be constant. The DT's of the thermocouples immersed in water will be much lower. The temperature distribution along the probe when the thermocouples 41, 42 and 43 are in air and when thermocouples 44, 45 and 46 are immersed in water are shown as 57 in FIG. 3. From comparison of the difference in temperatures of the six thermocouples 41–46 to each other, it can be determined which thermocouples or discrete points are immersed in water.

Figure 4:
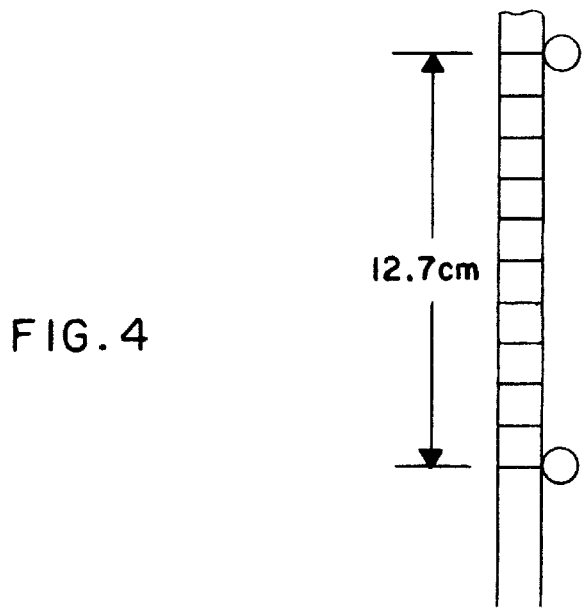
FIG. 4 Division of space thermocouples 43 and 44 into the equal increments for intermediate level reading.
Figure 5:
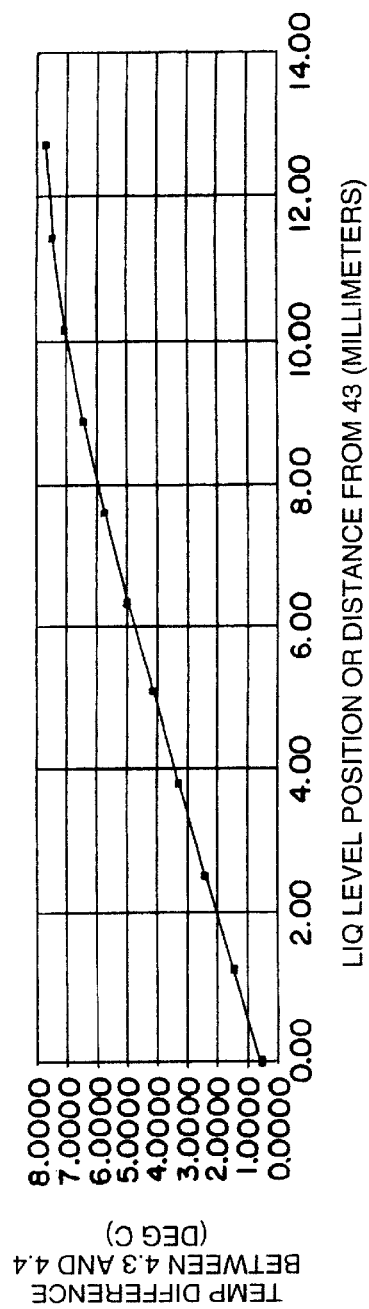
FIG. 5 Temperature difference between thermocouples 43 and 44 versus liquid level position between 43 and 44.

The invention can also be used to determine the liquid levels at intermediate points between the thermocouples locations. Supposing the liquid level is somewhere between thermocouple 43 and thermocouple 44 and it is desired to determine the location of the liquid level within 1.3 millimeter. The space between thermocouple 43 and thermocouple 44 of the probe 40 in the embodiment depicted in FIG. 2 is 12.7 millimeters. If the space is divided into ten equal spaces as shown in FIG. 4, the distance between each intermediate mark is 1.27 millimeters, within the 1.3 millimeter accuracy desired. Referring to FIG. 2 and FIG. 4, as the level of the water is varied from thermocouple 43 (o distance from thermocouple 43) one intermediate mark at a time to thermocouple 44 (12.7 millimeter distance from thermocouple 43), the actual temperature of thermocouple 43 and thermocouple 44 and the difference between the two temperatures will vary, as shown in Table 2 and FIG. 5. These data can be processed by the microprocessor to where the actual liquid level is. The thermocouples or equivalent temperature sensors used to measure the temperatures at the various locations will have to be able to provide much more accurate readings than when only discrete temperature levels are being measured. This can be accomplished by using the entire spatial profile of differential rather than absolute thermocouple readings.

The performance characteristics of the invention with other liquids such as gasoline fuel or engine lubrication oil will be similar to that of water. However, in the case of liquids like lubrication oil, which have lower heat removal efficiency than water, but much higher than air, more precision temperature measuring devices and more sophisticated signal conditioning may be required to achieve the same overall performance 9signal to noise ratio), because the temperature difference between thermal sensors may not be as pronounced as that when water is used. Instead of keeping the same signal to noise ratio for liquids with different heat removal efficiency by using more accurate temperature sensor (reduce the noise), it is possible to keep the same overall performance by driving the sensor to a given temperature response. However, for some applications like oil/water or liquid/vapor. The choice of driving the sensor to a given temperature might be constrained and temperature sensors with smaller uncertainty need to be used to achieve the same overall performance.

The invention describe herein is one configuration. Other configurations, such as probes in the shape of very thin metallic strips deposited on a printed circuit board may be used. The principle of operation of the probe, which is the novel feature of this invention, applies to other configurations.

Figure 6:
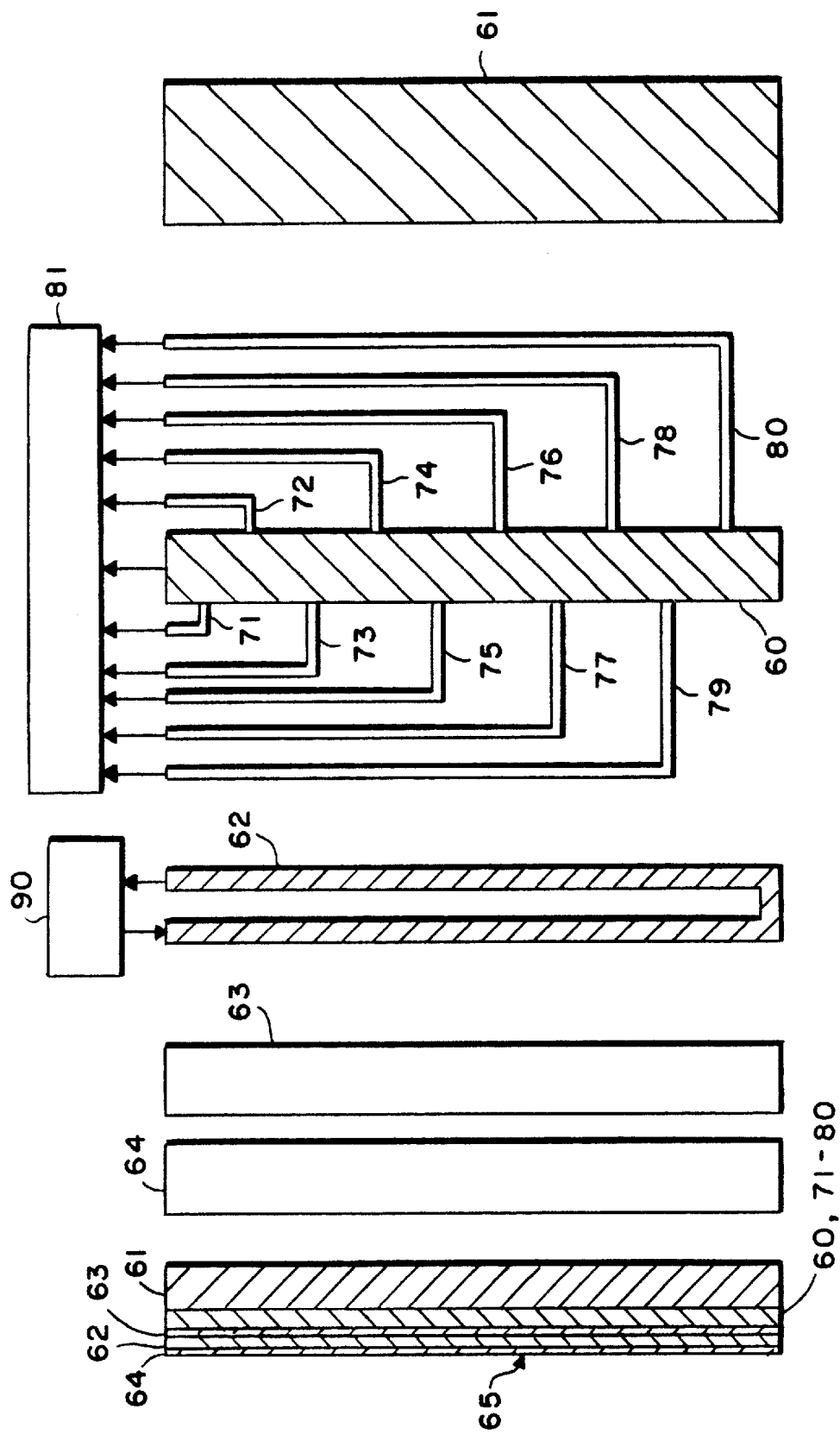
FIG. 6 Another embodiment of invention employing a strip probe.

Another embodiment of the apparatus claimed in this invention is metallic strip version of FIG. 2 which is depicted in FIG. 6. The probe is comprised of a strip of Constantan attached to a fiberglass or a film substrate or a plastic sheet, or an equivalent printed wiring board material 61, a series of Copper pads (taps) 71 through 80 also attached to board 61 and electrically connected to a Constantan strip 60 to form a series of thermocouple connections herein referred to as the thermocouple network, a heater strip 62 also attached to board 61 but electrically isolated from said thermocouples network with a thin dielectric film 63, and a second thin dielectric film 64 electrically isolating the heater strip 63 from the air or liquid to which the probe is exposed. A DC or AC power source 90, provides pulsed electrical energy to heat the heater strip 62. The thermocouple networks senses the probe temperature at various points along the probe and sends the appropriate electrical differential voltage signals to the microprocessor 81. The precise liquid level location can be determined by processing the signals and determining the corresponding temperature profile along the probe.

The basic embodiment of a simple two-metal strip (e.g. Constantan with Copper taps) eliminates the need for specialized thermocouple electronics. Traditional systems that employ thermocouples use "cold junction compensations" to yield an absolute temperature measurement, then process that data. The tapped strip approach simplifies this to a data set that is entirely composed of differential temperature measurements. The absolute temperature along the strip is not needed for the basic level-sensing applications, but is readily added with a discrete sensor at a single location along the strip if desired. Further, by reducing the probe to an entirely copper interface, the complications and cost of bringing out a dissimilar metal lead is avoided.

The thermocouple junctions in FIG. 6 are formed between the leads and the sensing strip, with suitable thermal, electrical and chemical insulations to keep data clean and the probe stable.

Figure 9:
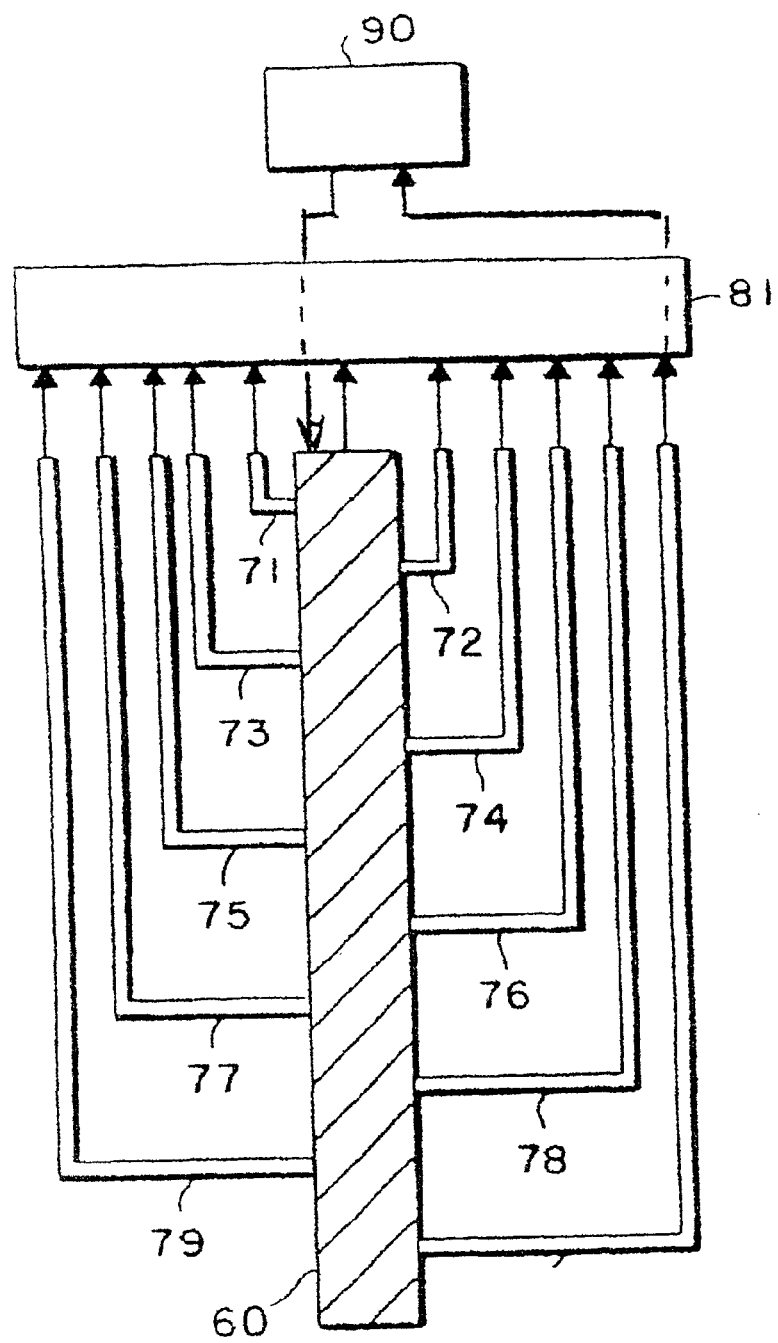
FIG. 9 Another embodiment of invention employing a common strip and heater probe.

Another variation of the apparatus claimed is a modified strip design of FIG. 6 as shown in FIG. 9, whereby the Constantine strip (60) is used as the heater that is heated by power supply 90 as well as the common wire for the thermocouples. Such a design will eliminate the heater and the thin layer that electrically insulates the heater from the thermocouple junctions. This modified design of FIG. 9 will also have smaller thermal mass and thus faster response time than the probe of FIG. 6. The power to the probe of FIG. 9, will be applied to the Constantine strip as a set (cycles) of many short on and off pulses. The duration of the pulses is very small compared to the time constant of the heater. For example, if the heater has a time constant (response) of 1 second, we can apply the heat cycles as equal or non-equal pulses of a few milliseconds. During the on portion of the heating power cycle there will be no measurement taken by the thermocouples. During the off portion of the heating cycle, the temperature measurement from all of the thermocouples along the probe will be taken. Those measurements can be taken a few times (during the off portion of the power cycle) to minimize the random errors by using time-averaging of the reading from each thermocouple.

The top and bottom layers of the probe of FIG. 6 or 9 can be made of thermoplastic material and those two layers together with a Copper trace pattern and a strip of Constantine can be clamped together and put in a thermal chamber for a short time and at this way make the thermocouple junctions without using soldering or ultrasonic welding as well as eliminate the need to bond the two layers with adhesive that most likely will dissolve in fuel or other liquids.

In addition to using lamination technology to produce the probe in FIG. 6 or 9, this probe can also be produced using the production methods of vacuum deposition, screen printing, molding or a combination of those methods.

The invention can also be used to determine the kind of liquid from a set of liquids. For example, determining the kind of fuel in a fuel tank from a set of fuels. The method of determining the kind of fuel will be based on three parameters that are shown in FIG. 3. The first parameter is the height or rise of line 56 in FIG. 3 above the liquid temperature after a given amount of power is applied to the liquid for a given amount of time. The second parameter is the difference between line 55 and 56 in FIG. 3 after a given amount of power is applied to the probe after a given amount of time. The third parameter is the curvature of line 57. If we use only the first parameter, it will be hard to determine which liquid to select since two different liquid with the same thermal convection will raise the reading from the thermocouples that are in liquid by the same amount. However, the transfer of heat across the boundary between the liquid and air or two other liquid mediums will be different and thus the second and third parameters (for two different liquids that have the same thermal convection) will also be different.

Experiments performed on a prototype similar to the configuration described in FIG. 2 indicated similar temperature profile trends as those predicted analytically, although the precision was not close to analytically predicted precision. This is because the sensors used in the prototype did not have the accuracy required for such precision.

Figure 7:
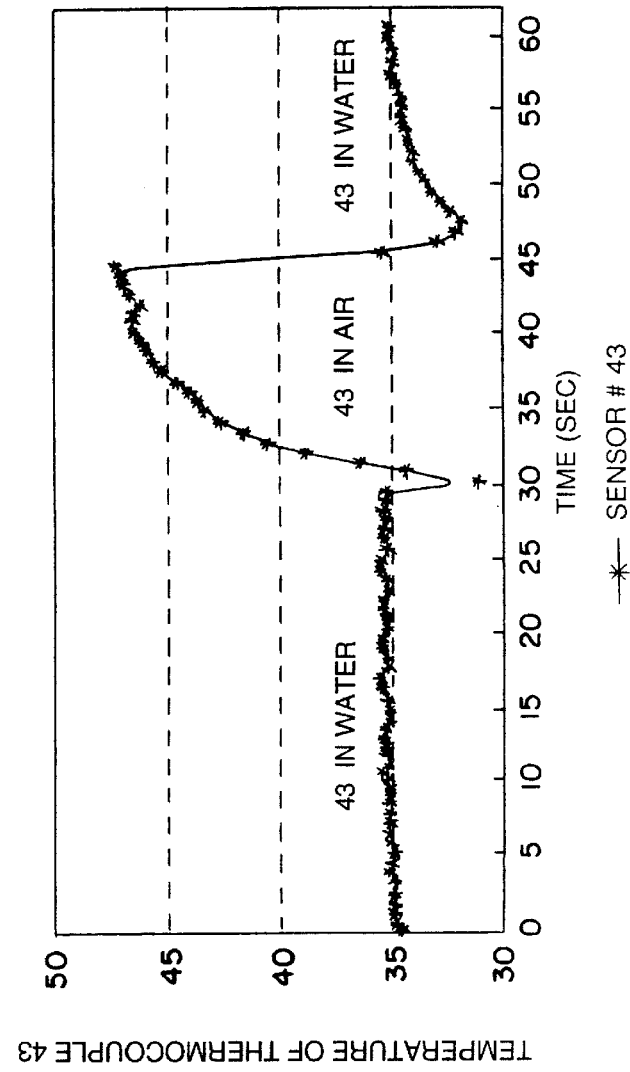
FIG. 7 Temperature behavior of 43 when initially immersed in water and then exposed to air.

The same experiments also indicated that the probe temperature momentarily dips in temperature when exposed to air after being immersed in water, is shown in FIG. 7. This is because the small amount of water entrained on the probe is evaporated, causing the temperature to dip. As the entrained water has been evaporated, the temperature of the probe then rises to the level of that when it is in air. This characteristics of the probe could be employed in the detection of ice formation on the external surface of an aircraft, because when the sensor is in ice, it is normally insulated thermally from the surrounding air or water, and the probe temperature is expected to rise.

Figure 10:
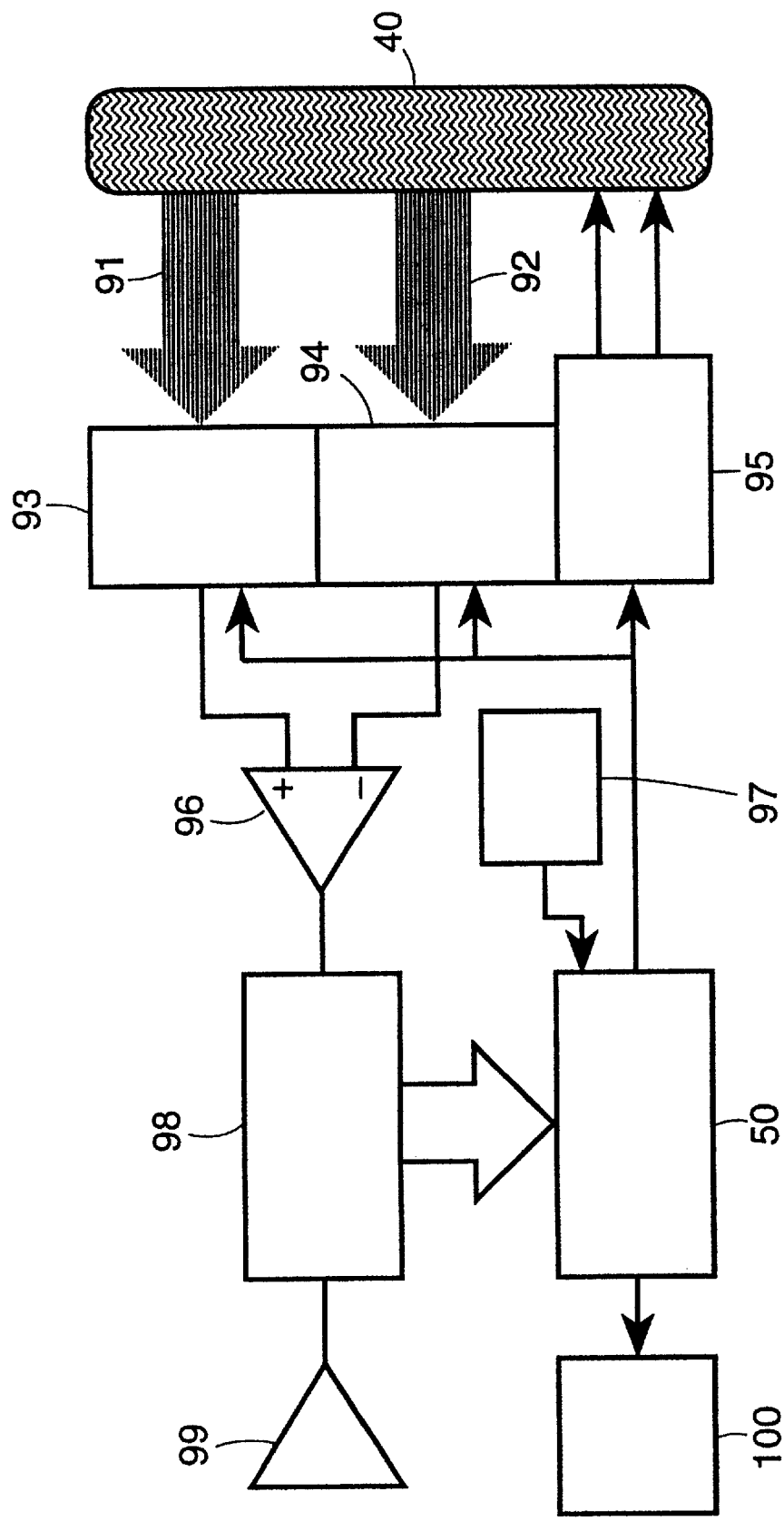
FIG. 10 Data Acquisition.

FIG. 10 shows the Data Acquisition that was developed for this probe. In this figure, 40 is the probe with the thermocouples. The entire data acquisition is controlled by 22, the microprocessor. The microprocessor, 22, commands the power supply 95 to apply power to the probe 40. Subsequently, the microprocessor commands the multiplexers 93 and 94 to scan and measure the analog thermocouples voltages after the power is applied. To eliminate non-random errors in the thermocouple readings, that are caused by the electronic hardware and the connections, the scanning of the thermocouples is not done sequentially. For example, let us say that we have a probe with 11 thermocouple junctions. One of the thermocouple junctions (i.e. the Copper wire of the first junction between this Copper wire and the Constantan) or the Copper trace from another point on the probe that is not a thermocouple junction (but is a junction between the Constantan and a Copper trace), can be used as a reference point 0. The wiring between the probe and the multiplexers are such that a Copper wire goes from the reference point 0 to multiplexer 93 and another Copper wire goes from the same reference point to the second multiplexer 94. The Copper wires from all of the odd thermocouple junctions will go to multiplexer 93 and all of the Copper wires from the even thermocouple junctions will go to multiplexer 94. If thermocouple junction 1 is selected as the reference point 0. Then all 5 Copper wires from the odd thermocouple (3,5,7,9,11) junctions and the one wire from the reference point 0 will go to multiplexer 93. Similarly the multiplexer 94 will also have 6 wires. 5 from the Copper traces of the even thermocouples and one wire from the reference point 0. The first measurement that is done is the voltage difference between the Copper trace of the reference point 0 (V0) on multiplexer 93 minus the voltage reading of junction 2 (V2) on multiplexer 94. Assuming the total non-random (bias, slow drift etc.) on the lines and connections leading to multiplexer 93 is e1 and for multiplexer 94, the total non-random error is e2. The differential voltage reading for each thermocouple junction will come through differential amplifier 96. The sequence of sampled voltage differences for each thermocouple junction will go from the differential amplifier 96 through Analog to Digital Converter 98 which is powered by 99. The first differential voltage reading is equal to:

$$V0+e1-(V2+e2) \quad (3)$$

The next reading is the differential reading between thermocouple junction 3 on multiplexer 93 and the reference point 0 on multiplexer 94. If we define V3 and V0 as the voltage signal (without bias or random noise) from thermocouple junction 3 and reference point 0 respectively, then this reading will be equal to:

$$V3+e1-(V0+e2) \quad (4)$$

The next reading will be taken between thermocouple junction 4 (V4) and the reference point 0 (V0) and it is equal to:

$$V0+e1-(V4+e2) \quad (5)$$

By subtracting (in the microprocessor) the voltage reading of equation (3), the voltage reading of equation (5) we get the accurate differential reading of thermocouple 4 relative to thermocouple junction 2 (i.e. the errors e1 and e2 are eliminated). Similarly, the voltage reading of the odd junctions relative to the first odd junction (junction 3) will also eliminate the non-random errors. It is to be noted that by placing accurate absolute temperature sensor close to the reference point 0, (i.e. coupling thermally junction 0 and the absolute temperature sensor) it will be possible to determine accurately the absolute temperature of each thermocouple junctions. Using thermocouple junctions of Constantine and Copper each one degree C. correspond to 40 microvolt voltage difference between the reference point 0 and a thermocouple junction on the probe. The data acquisition has a reference absolute temperature sensor 97 and the microprocessor 22 can send out the absolute temperature from each junction either as Analog or digital signal 100. In addition to using the microprocessor to calibrate the non-random error of the electronic hardware and the wiring, the microprocessor will also be used to average the differential time sample reading of each thermocouple and at this way to minimize the magnitude of the random error. After the software of the microprocessor completes the determination of the liquid level, or determine the kind of liquid or other liquid parameters like viscosity, from the profile of the temperatures (or voltage) along the probe, the microprocessor will send those parameters to a digital or analog display through a serial and analog-to-digital converter input/output 100. It is to be noted that the elimination of the non-random electronic hardware errors, minimization by averaging of random errors in the voltage reading from the thermocouples as well as the pulsed heating of the probe will be done with software in the microprocessor.

The liquid level sensor invention described (the strip is most useful design) herein can also be adopted to detect ice formation on the external surfaces of an aircraft, roofs and bridges by characterizing the signature (detail in the profile) associated with the "Igloo effect" and the various forms of water/ice. disturbing the heat flow. When the sensor is covered with ice, it is normally insulated thermally from the surrounding air or water. When the probe is heated, and the amount of power applied to the probe is not too high then at the beginning of the power application, the probe temperature will not rise since the ice needs power to overcome its latent heat and melt a thin layer of ice. The volume of the melted ice is smaller than the volume of the ice and there will be an air gap between the melted water and the remaining ice. The additional heat that is applied to the probe will raise the air gap temperature to the level expected when a surrounding wall of ice, not in contact with the probe, insulates thermally the melted thin layer of ice from the environment. The transient and steady-state data will be used to infer what is there on any section of the probe.

Figure 11:
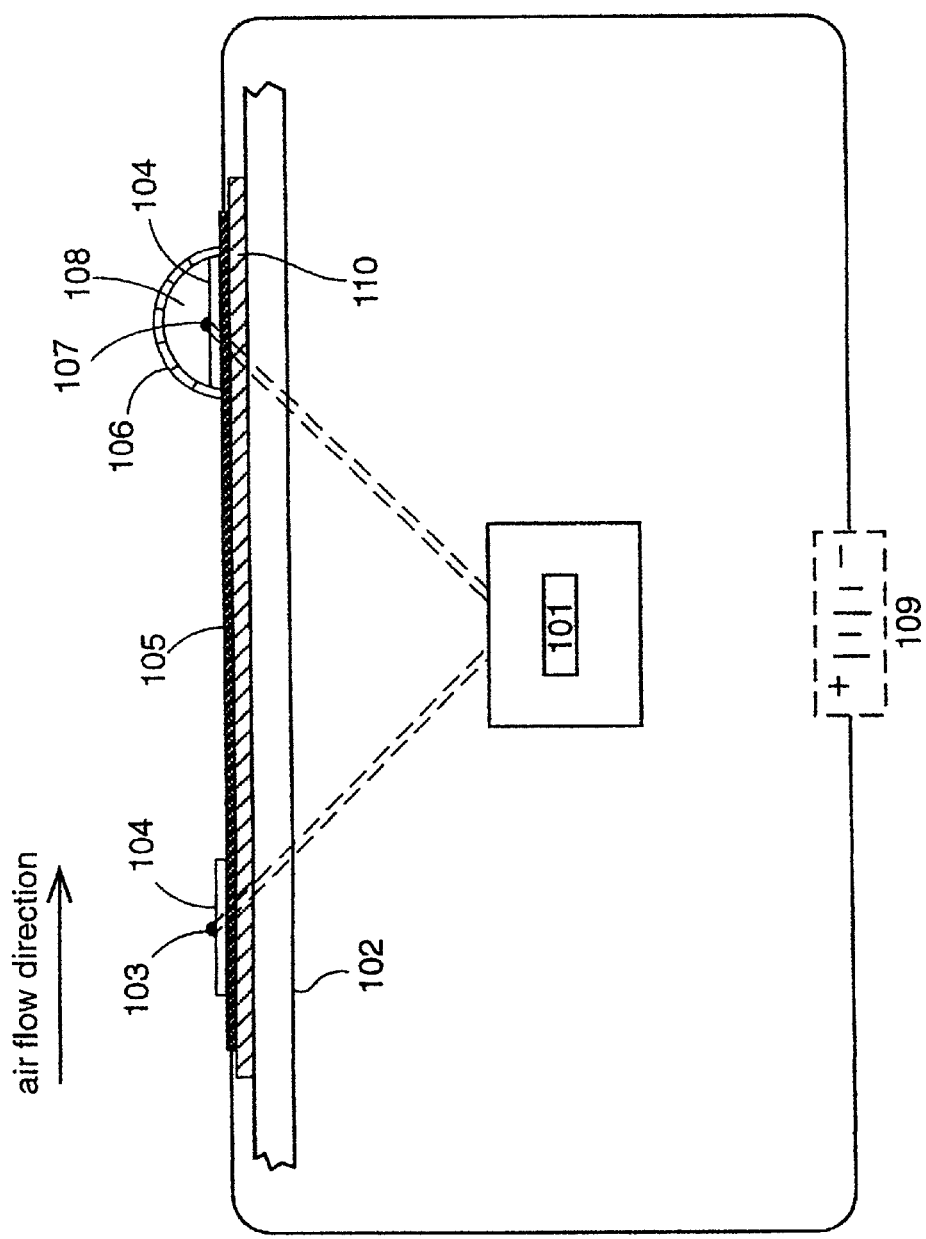
FIG. 11 Schematic Diagram of Ice Detection Sensor.
Figure 12:
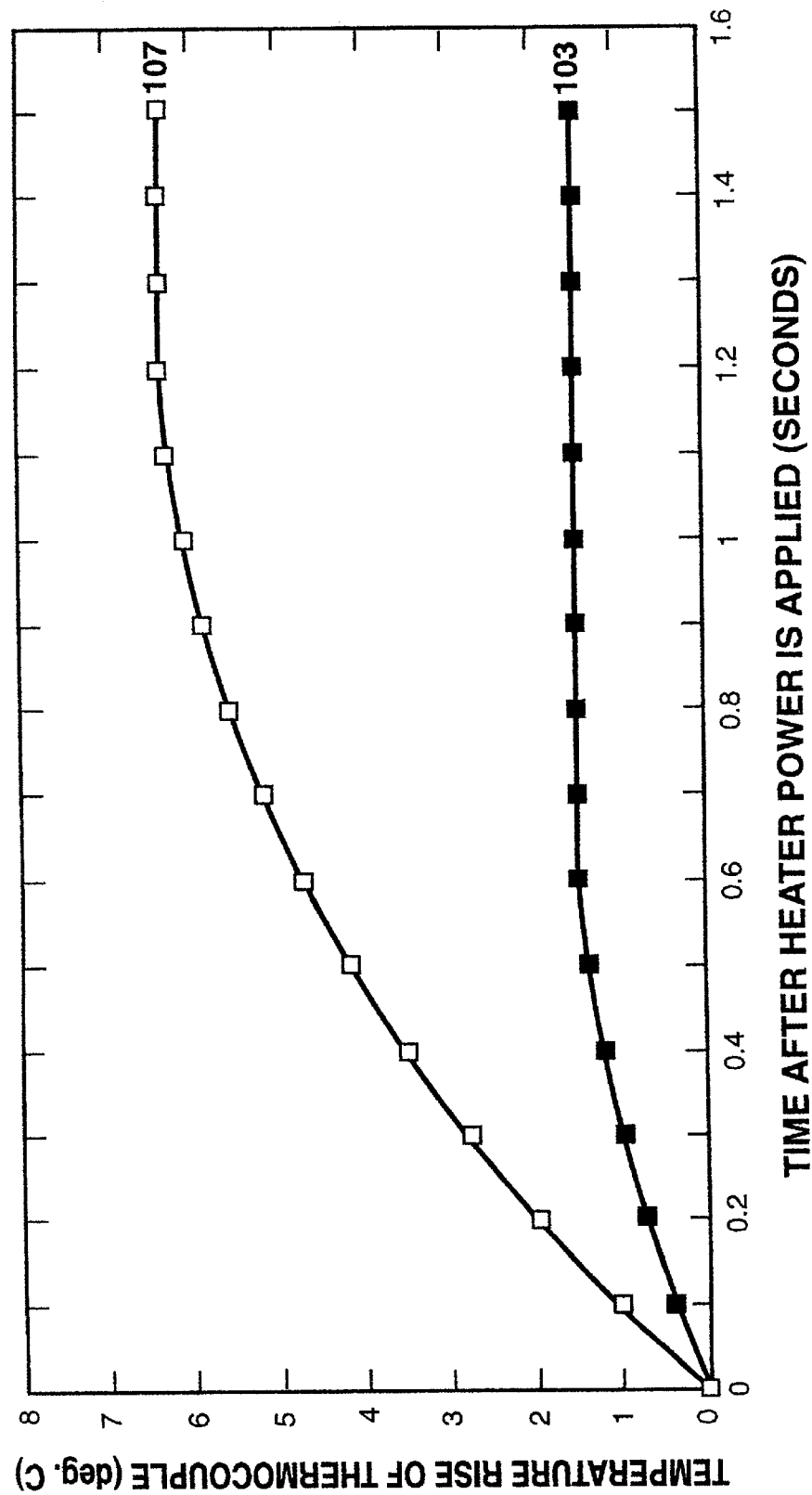
FIG. 12 Temperature rise of Thermocouples 103 and 107 after power is applied for no ice condition.
Figure 13:
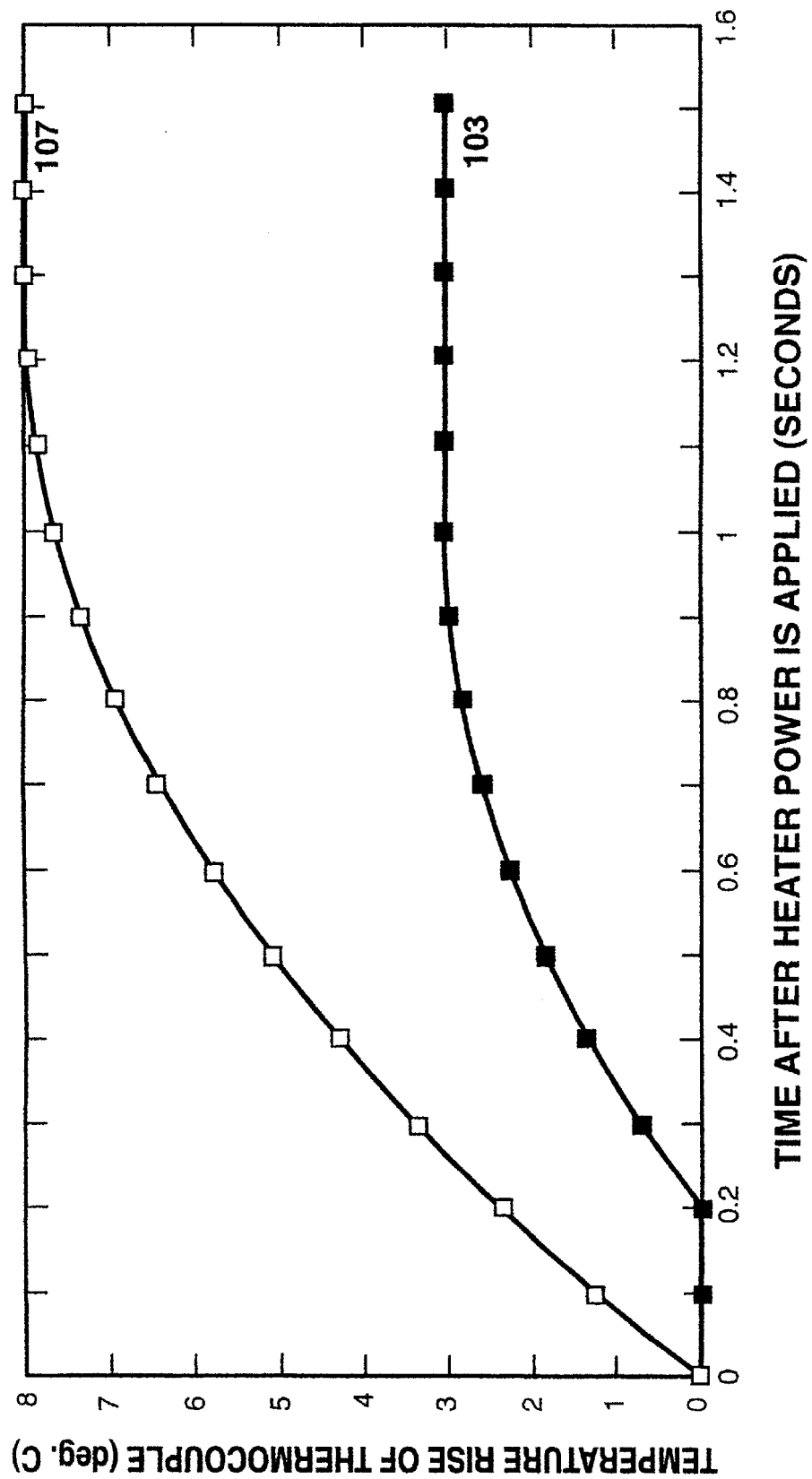
FIG. 13 Temperature rise of thermocouples 103 and 107 with ice formed over the sensor.

One version of the sensor for detecting ice is illustrated in FIGS. 11, 12 and 13. FIG. 11 is a schematic diagram of the ice detection sensor attached to the surface of an aircraft wing 102 or other structure. The sensor is comprised of an insulating material or insulation 110 attached to the wing surface, a heater strip 105 attached to the thermal insulation 110, a power supply 109 for providing electrical power to the heater strip, two sections of film type insulator 104, attached to the heater strip to electrically isolate the thermocouples from the heater, a first thermocouple 103 attached to the first film insulator and exposed to the outside air, a second thermocouple 107 attached to the second film insulation, an insulated dome 106 enclosing 107 within which a volume of air 108 is also enclosed, and a data acquisition system 101 or similar device to read and/or record the temperatures or equivalent voltages measured by thermocouples 103 and 107. The heater strip have active heating areas only immediately under thermocouples 103 and 107.

In FIG. 11 there is no ice forming over the wing surface so the ice detection device is exposed to air that flows over the surface of the wing. When no power is applied to the heater strip, the temperature of thermocouples 103 and 107 are essentially equal to the temperature of the air flowing over the wing surface. When a certain amount of power is applied to the heater strip, the temperature of thermocouples 103 and 107 will rise and level off to their steady-state values. This steady-state temperature rise is expressed by the following equation:

$$DT=QR \quad (6)$$

Where DT is the steady-state temperature rise,
Q is the power dissipated in the vicinity of the thermocouple,
R is the overall thermal resistance between the sensor and the surface in the vicinity of the thermocouple and the air flowing over the surface.

The transient temperature is the rise as a function of time of thermocouple 103 and 107 and is expressed by the following equation:

$$DT(t)=DT(!-exp(-Bt)) \quad (7)$$

Where DT(t) is the temperature rise as a function of time,
exp is a natural logarithmic function,
B is the inverse of the system time constant (response) which is in turn a function of the overall system thermal resistance and the overall system thermal capacitance,
t is the time variable.

As can be seen in equation 6 and 7, DT is a constant while DT(t) is an exponential function. The characteristic plots of DT(t) for thermocouples 103 and 107 as a function of time are shown in FIG. 12, for a case where there is no ice formation on the surface of the wing (see FIG. 11). After the heater power has been applied for sometime (at least 1.5 second), DT(t) for each thermocouple reaches its maximum (i.e. steady-state) value. The maximum value is equal to DT, the steady-state temperature rise expressed in equation 6.

When there is ice formation on the wing surface of the aircraft, the temperature rise profile of thermocouple 103 and 107 are altered somewhat. When ice covers the dome of thermocouple 107 and thermocouple 103 and power is applied to the heater strip, a thin layer of ice over thermocouple 103 will be melted and since the volume of water is smaller than the volume of ice, there will be an air gap between the melted water and the ice above it. This is sometimes referred to as the "Igloo Effect". The temperature rise profiles as a function of time DT(t) are shown in FIG. 13. Thermocouple 107 has essentially the same temperature rise shape as that when there is no ice no ice formation on the dome 106 except that DT(the steady-state temperature rise) is somewhat higher, because of the additional thermal resistance induced by the layer of ice over the insulated dome. The DT)t) shape (profile) of thermocouple 103 has been more drastically altered however. In this profile, there is no temperature rise for the first 0.2 seconds because the temperature of 103 is constant while the change of phase from solid (ice) to liquid (water), i.e. the melting of the ice, is taking place. After the melting of the thin layer of ice has essentially ceased, because the heated area is too remote from the ice, the temperature of 103 begins to rise. As 103 temperature rises it assumes a similar shape as that where there is no ice formation but reaches a higher steady-state value because of the additional thermal resistance of the liquid water and the ice surrounding thermocouple 103. Based on FIG. 13 and 12, it can be seen that the profile of thermocouple 103 with ice cover has three parameters that are different than the temperature profile without ice. The three parameters are time delay at the beginning of applying power (i.e. no rise in the temperature of thermocouple 103), higher steady-state value and a response time that is closer to the response time of thermocouple 107 of FIG. 12 or 13. The calculation of the three parameters will be done with the software of a microprocessor. The same invention can be used for a probe with a single dome type of a thermocouple and a lot of thermocouples like thermocouple 103 to detect ice at different locations over the wing of an aircraft. The sensor of FIG. 11 can be mounted on a horizontal or vertical surfaces of aircraft. A modified version of the ice-detector shown in FIG. 11, is one that has a constant strip that act as the heater (when the heat pulses have a duration that is much smaller than the thermal response time of the constantan strip) as well as the common wire for the thermocouples. The data acquisition of figure together with a probe of FIG. 9 and a dome of FIG. 11 was used in various icing tunnel tests. In those tests, the readings from thermocouple 107 and 103 are differential relative to the reference point 0. The temperature rise in equations 6 and 7 are the differential voltages of thermocouples 103 and 107 relative to the reference pint 0.

Figure 8:
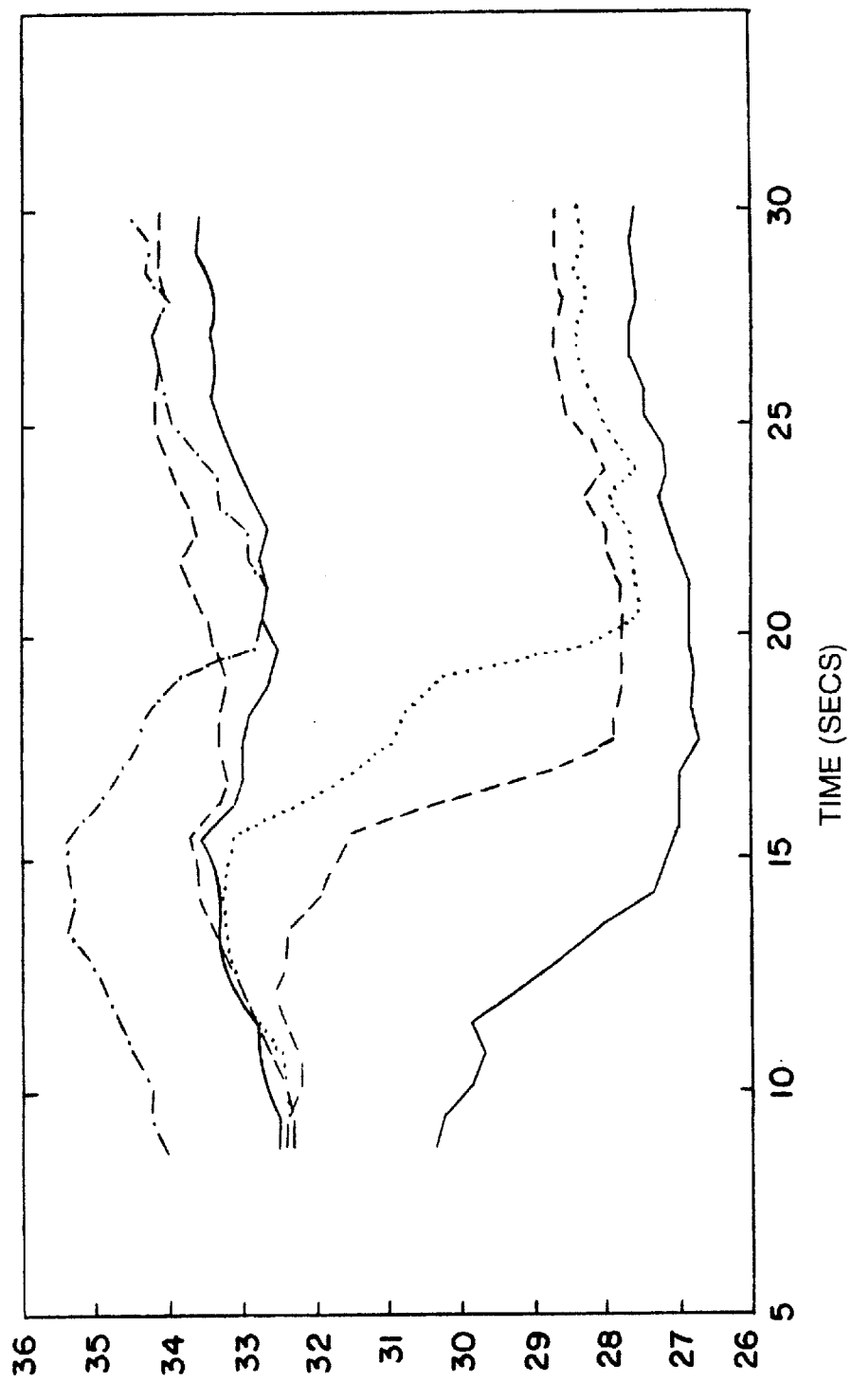
FIG. 8 Temperature behavior of 44, 45 and 46 in water while 41, 42 and 43 in oil.

Further tests of the behavior of the probe when immersed in a body of fluids containing water and oil, wherein the lighter oil stratifies above the water. There is a difference in temperature between that when the probe is in water and when it is in oil, as seen in FIG. 8, where the probe is moved up and down during the various time periods of the experiment.

The principle of operation described in this invention can also be applied to the measurement of the viscosity of a liquid, because viscosity is a key parameter that determines the convective heat transfer efficiency of the liquid. The lower the viscosity of the liquid the more efficiently it can transfer the heat, and the smaller the temperature difference between the heated surface and the liquid (DT) will be. An increase in viscosity of the liquid, which would result in a higher DT, generally indicates that the lubricating quality of the liquid has deteriorated to some degree. As such, a probe that work on the principle of this invention, can be used to determine whether it is time to replace a liquid, such as lubricating oil in an automotive engine.

The invention described herein can also be used to determine the density of a liquid. By measuring the temperature of the liquid and its pressure (with an appropriate pressure measuring device such as pressure transducer) at the same location, it is possible to compute, with a suitable microprocessor, the density of the liquid.

The invention described herein can also be used to determine accurately the liquid or gas temperature at the thermal junctions of the probe. Since the probe responds to the temperature differential between any two thermal junctions along the common strip (Constantan strip in FIG. 9), a reference accurate temperature sensor may be located at a convenient point (or the strip extended to such a point) and the temperature at any other point along the probe is resolvable. The calculation of the absolute temperature of each thermocouple location will be done with software using the thermocouple voltages differential whose non-random errors have been eliminated and random errors have been minimized.

The measurement process for this sensor relies on acquiring data from several sensor taps and reconstructing an analog of the thermal profile along the sensor, as sampled by those taps. The signal from the taps can be digitized in a number of ways, from simply dwelling on each tap in turn until the signal is adequately resolved to briefly reading each tap and increasing the signal resolution as needed through accumulating the results of multiple reads of the tap set. Likewise, the commutation sequence need not follow any specific order; however, noise reduction and ease of data processing are likely to dictate the optimal sampling approach for any given applications. Equally, a simultaneous sampling of all taps, using either multiple parallel converters or multiple sample/hold amplifiers, is workable (although this is likely to be the least cost-effective approach).

TABLE 1

TEMPERATURES AT 6 THERMOCOUPLE LOCATIONS

| THERMO-COUPLE | LIQUID LEVEL DEVICE TEMPERATURES (DEG C.) | | |
| --- | --- | --- | --- |
| NO | ALL IN AIR | ALL IN WATER | TC 4, 5 & 6 IN WATER |
| | 34.493 | 20.145 | 33.207 |
| 2 | 34.493 | 20.145 | 31.914 |
| 3 | 34.493 | 20.145 | 28.035 |
| 4 | 34.493 | 20.145 | 20.52 |
| 5 | 34.493 | 20.145 | 20.149 |
| 6 | 34.493 | 20.145 | 20.145 |

NOTE:
BOTH AIR AND WATER TEMPERATURES = 20 DEG C.

TABLE 2

PROBE TEMPERATURE VS POSITION OF LIQUID LEVEL BETWEEN TC3 AND TC4

| POSITION DISTANCE FROM TC3* (MM) | TC3 TEMP DEG C. | TC4 TEMP DEG C. | TC3–TC4 DEG C. |
| --- | --- | --- | --- |
| 0.00 | 20.6583 | 20.1445 | 0.5138 |
| 1.27 | 21.6055 | 21.1451 | 1.4604 |
| 2.54 | 22.5432 | 20.1454 | 2.3978 |
| 3.81 | 23.4567 | 20.1460 | 3.3107 |

TABLE 2-continued

PROBE TEMPERATURE VS POSITION OF LIQUID LEVEL BETWEEN TC3 AND TC4

| POSITION DISTANCE FROM TC3* (MM) | TC3 TEMP DEG C. | TC4 TEMP DEG C. | TC3–TC4 DEG C. |
|---|---|---|---|
| 5.08 | 24.3350 | 20.1477 | 4.1873 |
| 7.62 | 25.9577 | 20.1644 | 5.7933 |
| 8.89 | 26.6949 | 20.1971 | 6.4978 |
| 10.16 | 27.3829 | 20.2842 | 7.0987 |
| 11.43 | 28.0347 | 20.5194 | 7.5153 |
| 12.70 | 28.7412 | 21.0100 | 7.7312 |

*SEE FIG. 3
NOTE:
AIR AND ATER TEMP = 20 DEG C.

What is claimed is:

1. An apparatus for accurately determining the level in a liquid container, or the presence of ice on a surface, said apparatus comprising:

a first layer material comprising of an alloy strip secured along the longitudinal extent of the face of an elongated substrate or plastic sheet;

a plurality of metallic pads secured to said substrate, each pad having one end electrically connected to said alloy strap to form a plurality of thermocouples, said thermocouples being spaced apart over the longitudinal extent of said alloy constantan strip;

a second layer material comprising of a thin dielectric film secured to said substrate covering said thermocouples for electrically isolating said thermocouples from air or liquid;

means for applying electrical power to said alloy strip, controlled by a power control switch, wherein both ends of said alloy strip are connected to said electrical power applying means for heating by electrical pulses of said alloy strip;

display means for indicating the liquid level in said liquid container;

a data acquisition system comprising, analog and digital circuitry, a microprocessor, and display means for indicating said liquid level from temperatures sensed by said thermocouples.

2. The apparatus recited in claim 1, whereby the alloy strip is comprised of constantan and the metallic elements are comprised of copper.

3. The apparatus recited in claim 1, wherein said constantan strip is an electrically pulsed heater and a common wire for said thermocouples.

4. The apparatus recited in claim 1 whereby said data acquisition system comprises:

first and second multiplexers for odd and even thermocouples;

wiring of said multiplexers to a single differential amplifier, an and analog to digital converter, said analog to digital filter wired to a microprocessor; said microprocessor connected to a power supply capable of supplying power to said alloy strip, and a display capable of displaying information obtained from said microprocessor.

5. A data acquisition system as recited in claim 4, further comprising software used with the microprocessor, capable of eliminating non-random electronic hardware errors and minimizing random errors in differential voltage readings of said thermocouples.

6. A data acquisition system as recited in claim 4, further comprising of software capable of determining absolute temperature of each said thermocouples using said differential voltages.

7. A data acquisition system as recited in claim 4, further comprising of software determining the kind of liquid based on the curvature of the temperature profile, such that the transition temperature between the thermocouples in liquid and thermocouples in air Can increase or decrease depending upon the type of liquid being measured.

8. An apparatus for detecting ice on horizontal and vertical surfaces, comprising the apparatus of claim 1, further comprising a dome over one or more of the thermocouples and means for determining the response tame of the differential voltage for each thermocouple close to the response time of the voltage of the thermocouple under the dome.

9. A method for accurately detecting ice on one of horizontal and vertical and inclined surfaces, said method comprising the steps of:

operating the device of claim 8;

determining the presence of ice on any section of said surfaces by measuring a differential voltage from each said thermocouples;

determining the existence of a time-delay of said differential voltage time behavior of each thermocouple;

determining the steady-state differential voltage for each thermocouple close to the steady-state voltage of the thermocouple(s), under the dome;

determining the response time of the differential voltage for each thermocouple close to the response time of the voltage of the thermocouple(s) under the dome.

10. A method for accurately determining the liquid parameters of level, temperature and viscosity in a three-dimensional liquid container, said method comprising: Determining the three components of the temperature profile of the liquid being measured namely:

a first temperature value indicative of the sensor exposed only to air;

a second temperature value indicative of the sensor exposed only to liquid; and a transition range indicative of the temperature change along the length of the sensor determined by the temperature difference between the portion of the sensor in air and the portion of the sensor in liquid.

* * * * *